United States Patent
Kozitsky et al.

(10) Patent No.: US 9,082,038 B2
(45) Date of Patent: Jul. 14, 2015

(54) DRAM C ADJUSTMENT OF AUTOMATIC LICENSE PLATE RECOGNITION PROCESSING BASED ON VEHICLE CLASS INFORMATION

(71) Applicant: Xerox Corporation, Norwalk, CT (US)

(72) Inventors: Vladimir Kozitsky, Rochester, NY (US); Aaron Michael Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 13/904,559

(22) Filed: May 29, 2013

(65) Prior Publication Data

US 2014/0355836 A1  Dec. 4, 2014

(51) Int. Cl.
 G06K 9/00 (2006.01)
 G06K 9/32 (2006.01)
(52) U.S. Cl.
 CPC .................... G06K 9/3258 (2013.01)
(58) Field of Classification Search
 USPC ........................................................ 382/105
 See application file for complete search history.

(56) References Cited

U.S. PATENT DOCUMENTS

| | | | | |
|---|---|---|---|---|
| 5,101,200 A | * | 3/1992 | Swett | 340/937 |
| 5,651,075 A | | 7/1997 | Frazier et al. | 382/105 |
| 5,850,480 A | * | 12/1998 | Scanlon | 382/229 |
| 6,473,517 B1 | | 10/2002 | Tyan et al. | 382/105 |
| 6,982,654 B2 | | 1/2006 | Rau et al. | 340/937 |
| 7,825,829 B2 | | 11/2010 | Madsen | 340/937 |
| 8,218,822 B2 | | 7/2012 | Sefton | 382/105 |
| 2007/0058856 A1 | * | 3/2007 | Boregowda et al. | 382/159 |
| 2009/0202105 A1 | * | 8/2009 | Castro Abrantes et al. | 382/100 |
| 2012/0212617 A1 | * | 8/2012 | Wang et al. | 348/149 |
| 2012/0263352 A1 | | 10/2012 | Fan et al. | 382/105 |
| 2012/0269398 A1 | | 10/2012 | Fan et al. | 382/105 |
| 2013/0028481 A1 | | 1/2013 | Wu | 382/105 |

* cited by examiner

*Primary Examiner* — Amara Abdi
(74) *Attorney, Agent, or Firm* — Richard H. Krukar; Kermit D. Lopez; Luis M. Ortiz

(57) ABSTRACT

Methods and systems for improving automated license plate recognition performance. One or more images of a vehicle can be captured via an automated license plate recognition engine. Vehicle class information associated with the vehicle can be obtained using the automated license place recognition engine. Such vehicle class information can be analyzed with respect to the vehicle. Finally, data can be dynamically adjusted with respect to the vehicle based on a per image basis to enhance recognition of the vehicle via the automated license plate recognition engine.

20 Claims, 8 Drawing Sheets

FIG. 4

DRAM C ADJUSTMENT OF AUTOMATIC LICENSE PLATE RECOGNITION PROCESSING BASED ON VEHICLE CLASS INFORMATION

FIELD OF THE INVENTION

Embodiments are generally related to image-processing methods and systems. Embodiments are further related to video-based surveillance methods and systems. Embodiments are additionally related to the field of ALPR (Automatic License Plate Recognition).

BACKGROUND

ALPR systems generally include various image processing and computer vision techniques for: (1) locating a license plate within a scene, (2) segmenting characters on the plate, and (3) performing optical character recognition to determine the character sequence. In addition, determining the jurisdiction (e.g., such as the state associated with the license plate and the plate type) is often required. ALPR systems are used in electronic tolling, photo enforcement, parking, and other transportation applications where the vehicle identity is required.

Typical ALPR applications fix the choice of camera, lens, camera mounting location, vehicle trigger timing and distance, etc., at the design time to optimize the images sent for ALPR usage. Unfortunately, there are a number of noise factors, which cannot be fixed, that can substantially affect the performance of an ALPR system. These would include: the vehicle class (e.g., passenger car, large truck, motorcycle, etc.), the plate mounting location, the license plate design/layout, and the license plate size. For typical ALPR systems, these sources of variation often lead to images, which cannot be processed automatically and must instead be transmitted for human review.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide for an improved ALPR engine.

It is another aspect of the disclosed embodiments to provide for the dynamic adjustment of ALPR processing based on vehicle class information.

The aforementioned aspects and other objectives and advantages can now be achieved as described herein. Methods and systems for improving automated license plate recognition performance. One or more images of a vehicle can be captured via an automated license plate recognition engine. Vehicle class information associated with the vehicle can be obtained using some means other than, for example, the automated license place recognition engine. For instance, a commonly used method involves loop detectors built into the road surface that can measure characteristics such as the number of axels and spacing there between for a given vehicle. Such vehicle class information can then be analyzed with respect to the vehicle. Finally, data can be dynamically adjusted with respect to the vehicle based on a per image basis to enhance recognition of the vehicle via the automated license plate recognition engine.

Embodiments are thus disclosed for improving recognition performance by leveraging the vehicle class/type as a key input to the ALPR system. A number of critical sources of variability in the input images can be better addressed if the vehicle class is known a priori for a given image to be processed. Tolling lanes typically charge different rates depending on the number of axels or vehicle type and have hardware and logic in place to determine the vehicle type. In many cases, different vendors provide the toll lane operators and ALPR systems and these systems do not communicate with one another. The disclosed embodiments make use of this information to dynamically adjust key aspects of the ALPR processing on a per image basis. These adjustments can include (but are not limited to): smarter image cropping (for processing speed), dynamic image resizing to improve the capture rate of motorcycle plates, corrections to OCR results based on allowable character sequences for a given class of plates, and improved character level segmentation based on known license plate layouts for a given vehicle class.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 4 illustrates an LPR confusion matrix for particular jurisdictional characters;

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Automatic License Plate Recognition (ALPR) systems are generally composed of (A.) cameras, illuminators, and vehicle triggers which capture images of vehicles; and (B.) image processing and computer vision systems which perform processing which: (1) locates the license plate in a scene, (2) segments the characters within the license plate, and (3) performs optical character recognition (OCR) to determine the character sequence on the license plate. In addition, the State jurisdiction, the plate type, and other information are often required to be determined. ALPR systems are used extensively in transportation systems such as electronic tolling systems and photo enforcement systems (speed enforcement or red light enforcement) where vehicle identity is required.

Figure 1:
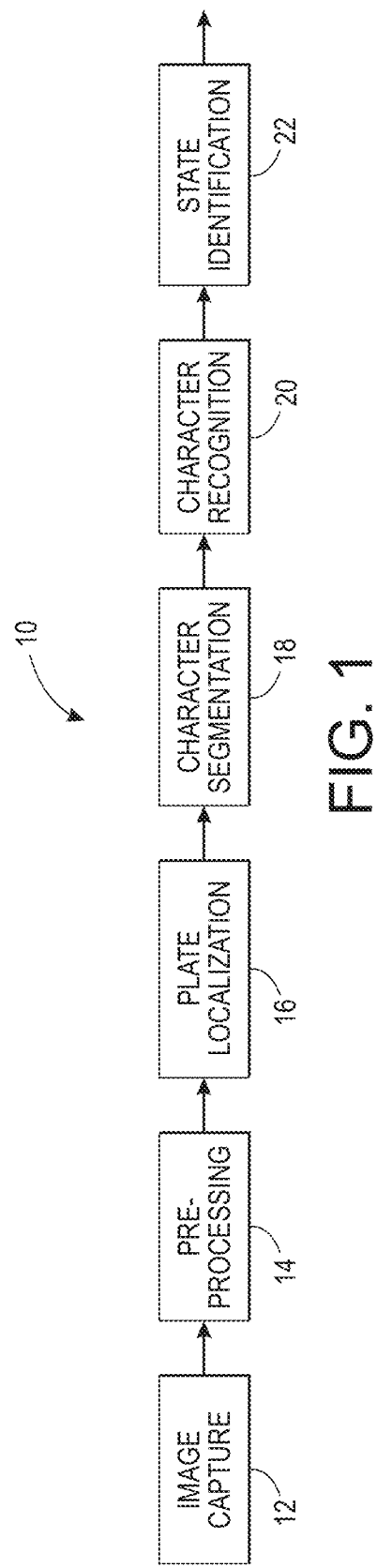
FIG. 1 illustrates a block diagram of an ALPR process, which can be implemented in accordance with one or more aspects of the disclosed embodiments.

FIG. 1 illustrates a block diagram of an ALPR process 10, which can be implemented in accordance with one or more aspects of the disclosed embodiments. As shown at block 12, one or more images of a license plate on a vehicle can be captured, presumably at or near a tolling station in the context of a toll road system. Pre-processing (e.g., image-processing) can then take place, as depicted at block 14. Thereafter, as indicated at block 16, a plate localization operation can be implemented with respect to the license plate(s) that appears in one or more of the captured images. Character segmentation can then take place, as shown at block 18, followed by a character recognition operation as indicated at block 20. Finally, state or jurisdictional identification can take place, as illustrated at block 22.

A typical process for training an ALPR solution for a given installation involves the collection of 10-50 thousand images that are reviewed by humans to obtain ground truth plate code and state information. This set of images and ground truth data can be then used to train the various subsystems of the ALPR algorithm shown in the block diagram of FIG. 1. In other words, this data can be used to determine key parameters of the ALPR engine. For typical ALPR systems these key parameters are fixed at design time and are not a function of the vehicle type.

End-to-end tolling solutions are typically a combination of services from multiple vendors. As a result, it is often difficult to enable information sharing between some elements in the system. Thus, competitive ALPR systems do not typically have access to vehicle type as an input. However, since some organizations provide their own tolling solutions and have their own proprietary ALPR engines, it is possible to leverage this key additional information to enable a competitive advantage.

Examples of the types of adjustments that can be made to the ALPR process based on vehicle class information are discussed in more detail below. These are not meant to be exhaustive, but rather to illustrate the types of advantages that can be enabled with the disclosed embodiments.

One type of adjustment involves "smart" image cropping. As part of the training process, the most likely location of license plates with respect to the field of view of the camera(s) can be learned. Since the camera is typically mounted on a fixed pole and license plates are typically mounted in factory specified locations on vehicles, this results in distribution that is concentrated in small areas of the captured images.

Figure 2:
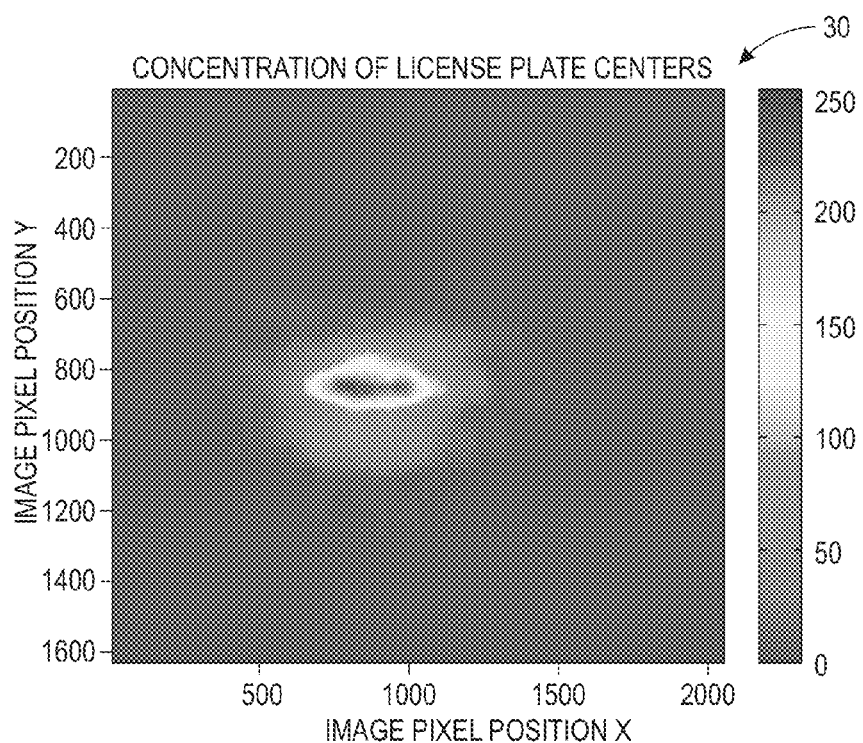
FIG. 2 illustrates a heat map of license plate centers.
Figure 3:
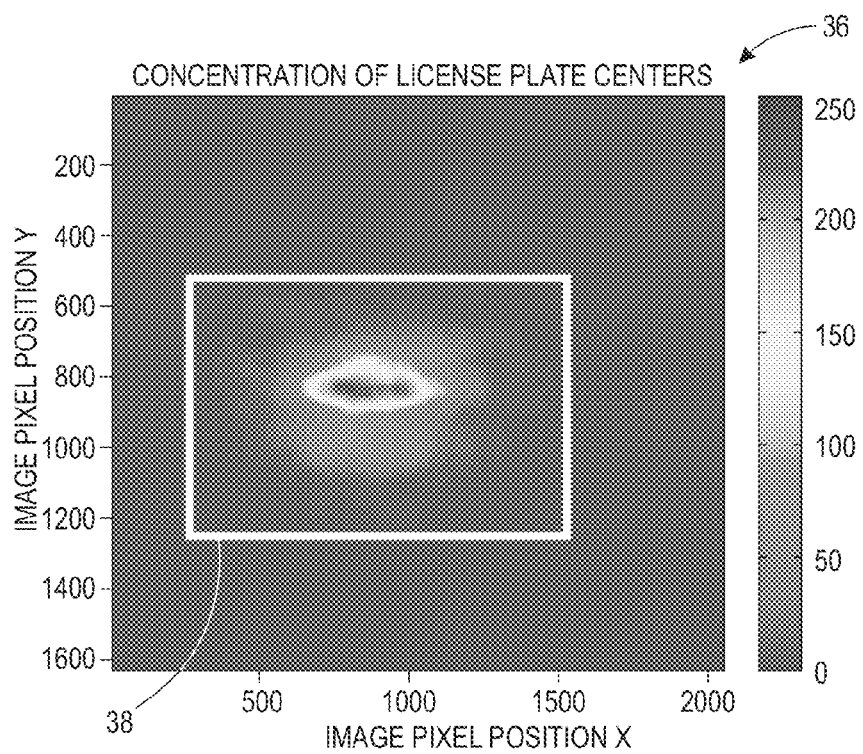
FIG. 3 illustrates a cropped heat map to reduce image size for license plate recognition applications

FIG. 2 illustrates a license plate (LP) heat map 30 for one particular installation. FIG. 3 illustrates a cropped heat map 36 to reduce image size for license plate recognition applications. Given the concentration of license plates in reduced regions of the captured image, ALPR algorithms typically crop the input image such that areas unlikely to contain plates are ignored. This results in a real-time improvement because the reduced area of the image needs to be searched for plates and accuracy improvement (i.e., removing the possibility of finding an erroneous "plate" in a region where plates typically do not appear). The real-time improvement is significant and typically scales with the size of the input image. FIG. 3 demonstrates that for the case illustrated in FIG. 2, enabling cropping reduces the effective images size by 66% and leads to a ~3× real-time processing improvement. The area 38 shown in FIG. 3 indicates the aforementioned cropping.

A problem arises for tractor-trailers, buses, and trailers where the license plates are mounted in "non-standard" locations. This class of vehicles comprises a small percentage of toll lane traffic and does not significantly impact the cropping selection algorithm leading to these plates being outside the optimal region and not being found by ALPR. The proposal is that the information regarding vehicle type be passed to ALPR along with the image. With this information, the ALPR algorithm or engine can disable the automatic cropping function for these images and capture the license plate since the entire image will now be searched. The execution time for these particular images may be greater, but with the ability to improve overall system yield.

A different problem arises for motorcycles. This is because motorcycle plates are typically half the size of standard vehicle plates and thus the plate characters are half sized as well. LPR components and geometry is typically designed to accurately capture the largest volume of traffic and thus the hardware is chosen to provide images where standard license plate characters meet the OCR specification of at least 25 pixel high characters. In general, OCR can decode characters lower then this requirement but not at the extremely high (99.8%) accuracies required.

From an ALPR perspective, resolution well above the 25-pixel requirement does not significantly translate into better performance but can lead to significantly increase real-time execution due to larger image sizes. To mitigate this, incoming images are typically resized such that the nominal plate character height is in a range of 25-35 pixels high. This creates a problem for motorcycle images since the resizing appropriate for passenger cars and trucks causes motorcycle plate characters to fall well below the 25-pixel requirement. The vehicle type input into ALPR would allow the algorithm to dynamically adjust the resizing, based on the known vehicle type, in order to capture motorcycle plates accurately.

As it stands today, motorcycle plates are typically missed completely or recognized with much higher error rates.

Figure 4:
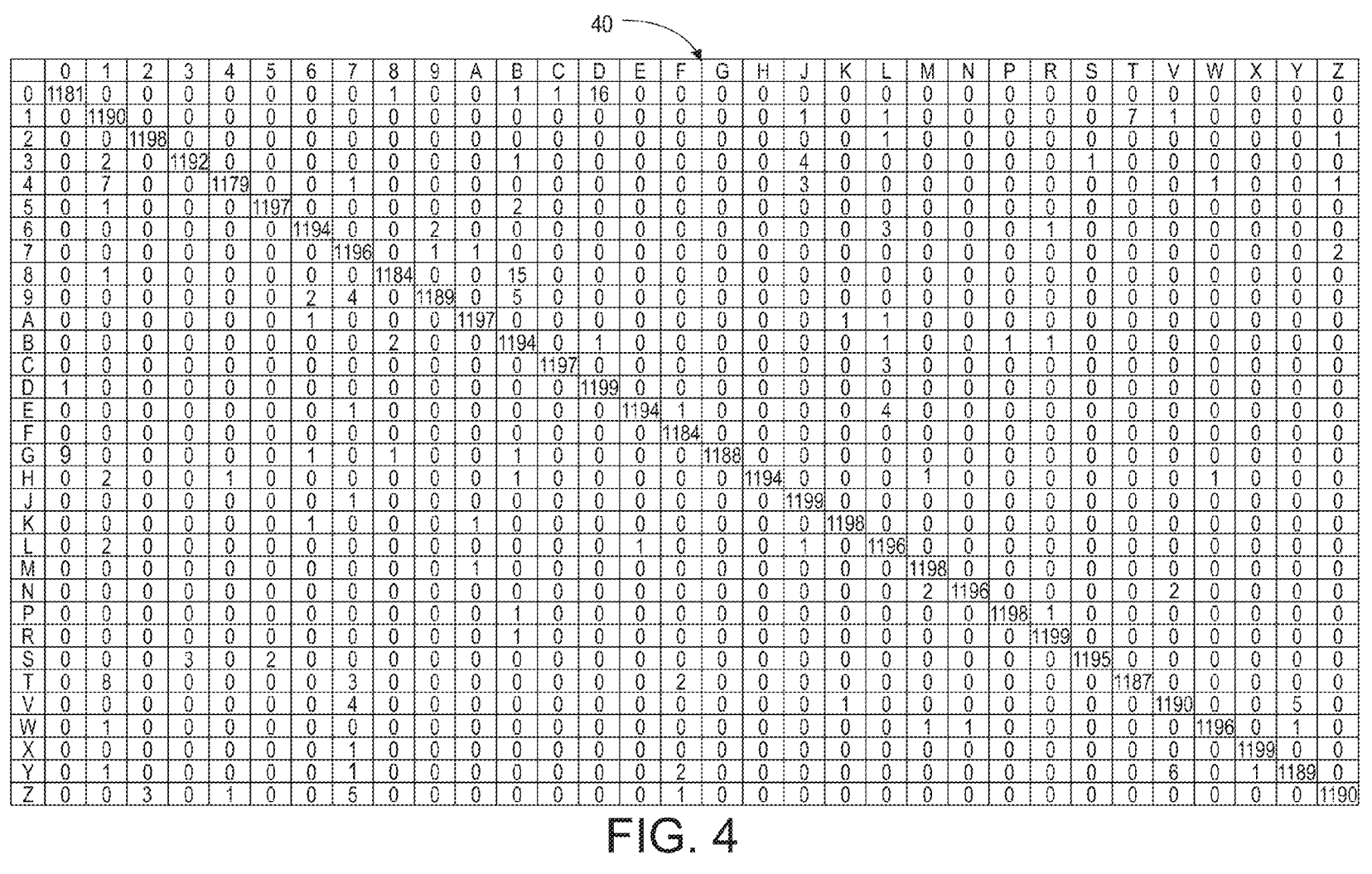

FIG. 4 illustrates an example LPR confusion matrix 40 for particular jurisdictional characters. Note that the OCR subsystem in an ALPR engine typically accepts individual character images as input and runs algorithms to classify the image as one of 32-36 (depending on jurisdiction) class labels such as A-Z and 0-9. The performance of a trained OCR engine when tested on an independent test set of particular jurisdictional characters (e.g., in this case, the jurisdiction is the State of Maryland) is thus depicted in FIG. 4 with respect to the matrix 40. As shown in FIG. 4, the example Maryland font excludes 'IOQU' and thus there are only 32 possible classes. The ground truth labels depicted in FIG. 4 are located on the X-axis and OCR conclusion is indicated with respect to the Y-axis. The matrix 40 can be referred to as a "confusion matrix" because license plate characters that are confused with one another by the system become readily apparent.

Figure 5:
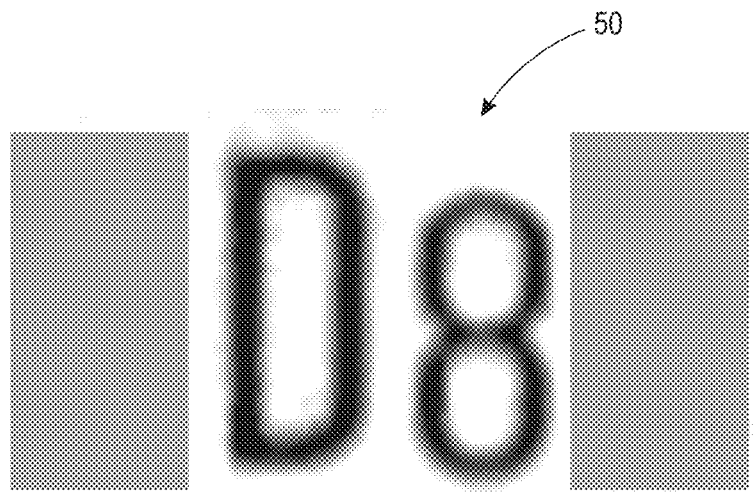
FIG. 5 illustrates a pictorial view of examples of particular license plate characters.

For a perfect OCR engine, all off diagonal entries would be zero. In FIG. 4 we see the two highlighted cases of OCR errors as 'B' incorrectly recognized as '8' ('B/8') and 'D' incorrectly recognized as '0' ('D/0'). These are the expected "close character" errors and the combinations change depending on the font. For California as an example, the 'A/4' comes up as a significant error. These close character errors become even more prevalent when the captured license plate image has more extensive blur in it. Actual "clean" Maryland character images 50 extracted from license plate images are shown in FIG. 5. One can easily see the strong similarity between these close character pairs, even under relatively "good" capture conditions.

Resolving this close-character ambiguity is critical to maintaining high accuracy in the OCR results. One method for achieving this is to use knowledge of the valid character sequences for a given state and/or plate type. For instance, in NY the standard passenger car license plate is formatted as three letters followed by four numbers (LLLNNNN). Thus, if the OCR of a NY license plate produces a result of A8C567B, the mistakes in the "8" and "B" locations can easily be corrected. The same would be true for the "0" and "D" close-characters since they too cross a letter-number boundary.

The disclosed embodiments can enable an extension of this technique through exploitation of the known vehicle class information. In particular, the vehicle class constrains the set of valid plate types and therefore the possible valid character sequences on the license plate. Consider for instance the standard passenger car plate layout (LLLNNL) and the plate layout for apportioned trucks (LLNNNL) in New Jersey. By way of illustration, a NJ license plate for which the OCR result is "GG834A" would then remain ambiguous. The standard form of the close-character corrections would not be able to determine how to resolve the correct plate code—it could be either "GG834A" or "GGB34A". By leveraging vehicle class information, the current invention would extend the existing methods by restricting the set of potentially valid plate sequences and would therefore easily resolve this type of ambiguity.

Figure 6:
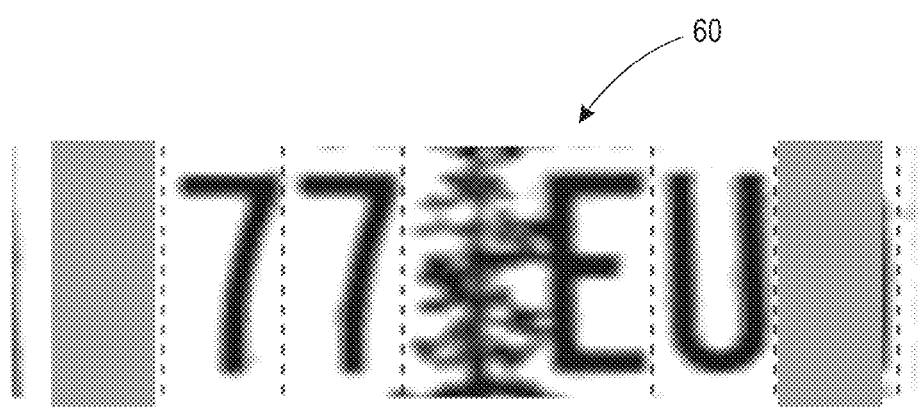
FIG. 6 illustrates a pictorial view of a difficult segmentation case.

An extremely challenging aspect of the overall ALPR problem is the segmentation of the individual license plate characters into separate images in preparation for OCR. The accuracy of the OCR process can be negatively impacted by inconsistencies in the segmentation. One particular challenge with segmentation is separating valid characters from logos and other symbols on the license plate. The image 60 in FIG. 6 illustrates an example of this type of situation, where the dashed lines represent the "cut points" output by the existing segmentation algorithm. Here one can see that the basic segmentation method has failed to separate the "E" from the center logo (an evergreen tree).

Figure 7:
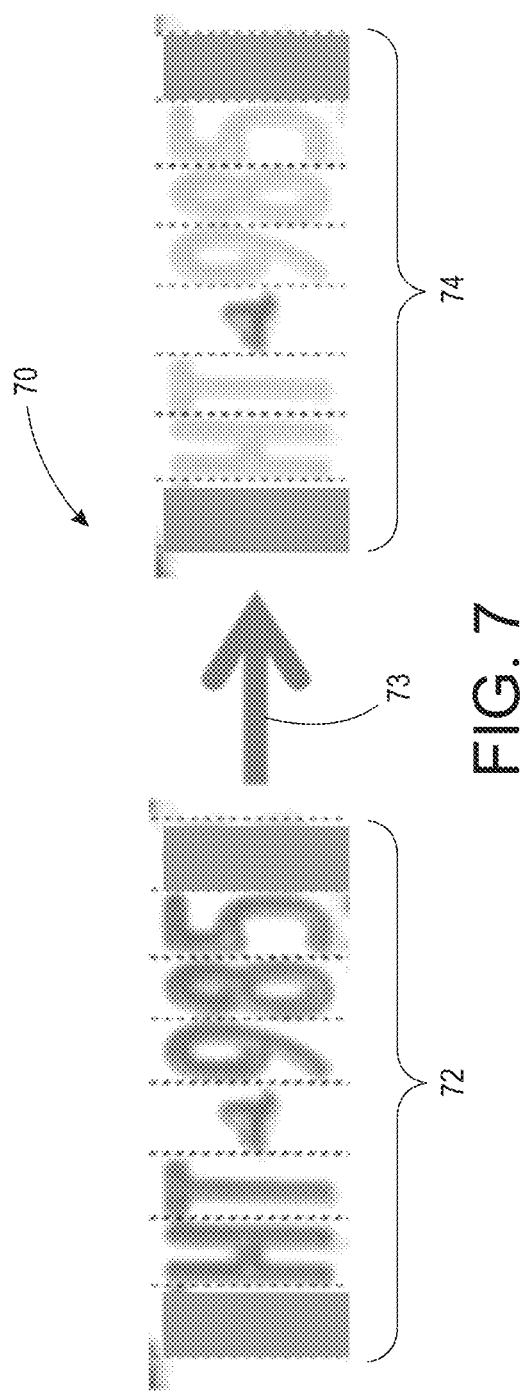
FIG. 7 illustrates an graphical example of identifying valid candidate characters versus extraneous content.

A related challenge is the ability to identify valid characters versus extraneous content, like logos and border artifacts, which may also appear in the plate image. An example of this is presented in FIG. 7 for reference. FIG. 7 graphically illustrates via an image 70 valid candidate characters versus extraneous content. Validated characters 74 are shown at the right of the image 70. Arrow 73 represents the validation process with respect to the original characters 72. Note that the center logo is sufficiently large and spaced at roughly the right pitch to be extracted as a potential character by the segmentation process. It is desirable to pre-screen these candidate characters prior to OCR in order to prevent erroneously recognizing a non-character as a valid symbol. For some ALPR engines, a second stage machine learning classifier can be used to screen these candidate character images.

Now consider that the layout of the information on the license plate—the location of the characters, logos, stacked characters, etc—is a function of the plate type. Further, the plate type is a function of the vehicle class. In other words, given the vehicle class it is possible to constrain the set of possible segmentation cut locations as well as the location of logos versus valid symbols. In other words, by leveraging the vehicle class information as proposed in the current invention the segmentation algorithms of the LPR system can more accurately choose the location of segmentation cuts and can identify valid characters with higher fidelity.

Vehicle classification to determine the correct toll for the driver can be accomplished using various means. One method involves counting the number of vehicle axels using sensors embedded in the ground. This is an old approach that cannot distinguish between sedans and motorcycles and is not reliable for trucks that have the option of lifting an axle before going through the toll area. This method is being replaced by a new method, which uses a laser scanner. The laser scanner returns a rough (low resolution) 3D image of the vehicle and machine learning algorithms are trained to classify the vehicle type based on prior examples.

There are multiple ways to pass the vehicle classification information to the LPR algorithm. For example, the simplest technique involves including this information as an extra parameter along with the captured image when calling the ALPR algorithm. The information can be embedded as part of the image name that is sent for ALPR. The information can also be embedded as part of the image tag that is sent for ALPR. The captured image can be modified with an overlay to include the information. The overlay can be text in a known location where plates are never seen or coded as a RGB or gray level value for a particular pixel in the image. As an example, the first pixel (first row and column) in the image can have the following values:

(0,0,0)—For normal image (128,128,128)—For motorcycle image to signal disabling of resize.

(255,255,255)—For truck, bus, trailer image to signal disabling of cropping.

Vehicle classification can also be accomplished using images only and thus can take place in some embodiments before the LPR algorithm as part of a standalone solution.

Figure 8:
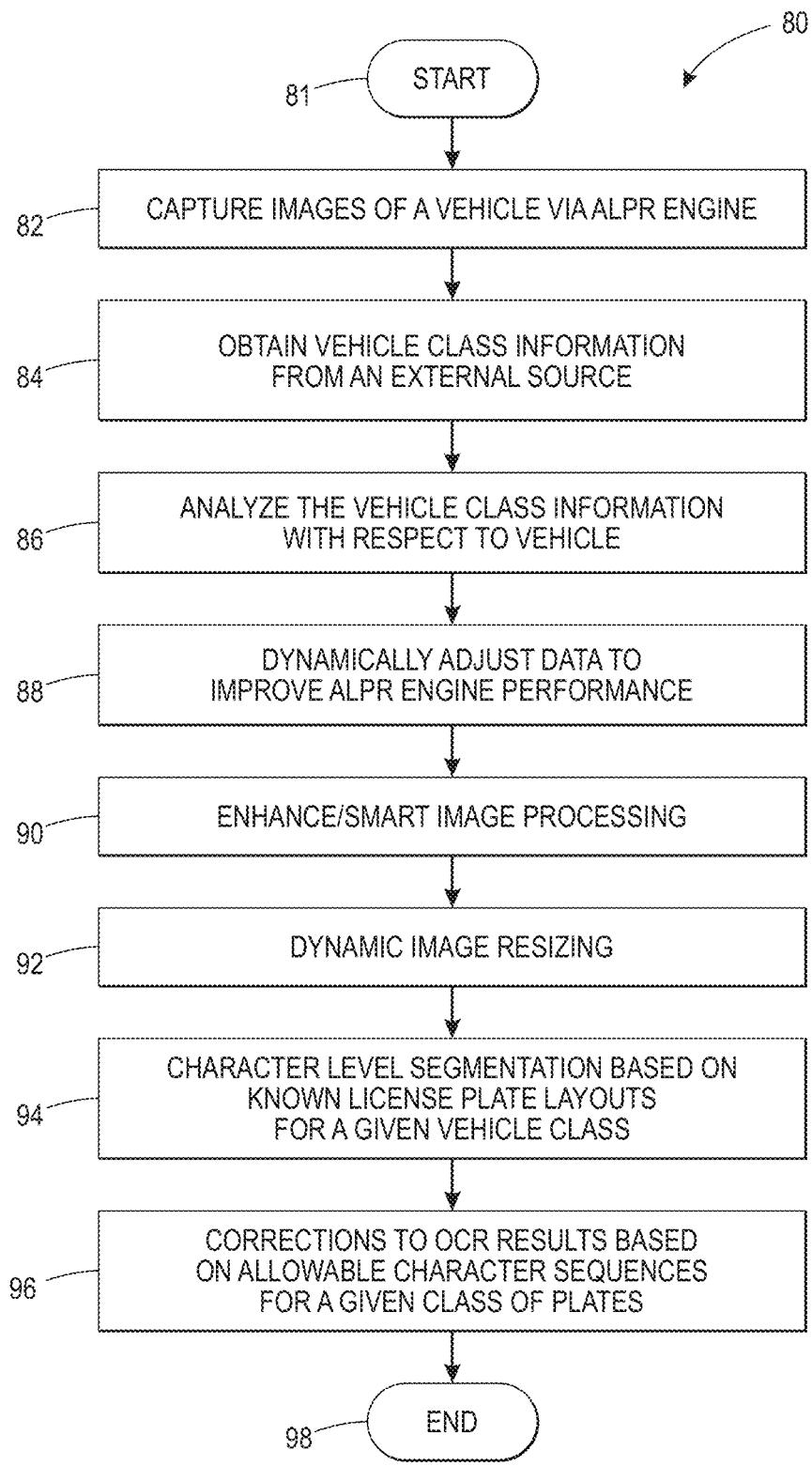
FIG. 8 illustrates a high-level chart of operations depicting logical operational steps of a method 80 for dynamic adjustment of ALPR processing based on vehicle class information in accordance with a preferred embodiment.

FIG. 8 illustrates a high-level chart of operations depicting logical operational steps of a method 80 for dynamic adjustment of ALPR processing based on vehicle class information, in accordance with a preferred embodiment. As indicated at block 81, the process can begin. Then, as shown at block 82, images of a vehicle can be captured via an ALPR engine. Then, as shown at block 84, vehicle class information of the vehicle can be obtained by the ALPR engine from an external source. The vehicle class information can be analyzed with respect to the vehicle shown in the image (or images) as depicted next at block 86. Thereafter as illustrated at block 88, an operation can be implemented to dynamically adjust data to improve ALPR performance. Such adjustments are shown at blocks 90, 92, 94 and 96. Method 80 allows the obtained information to dynamically adjust key aspects of the ALPR processing on a per image basis. These adjustments can include (but are not limited to): smarter image cropping (for processing speed) as depicted at block 90, dynamic image resizing to improve the capture rate of license plates (e.g., motorcycle plates) as described at block 92, improved character level segmentation based on known license plate layouts for a given vehicle class as depicted and block 94, and corrections to OCR results based on allowable character sequences for a given class of plates as depicted at block 96. The process/method 80 can then terminate, as depicted at block 98.

Figure 9:
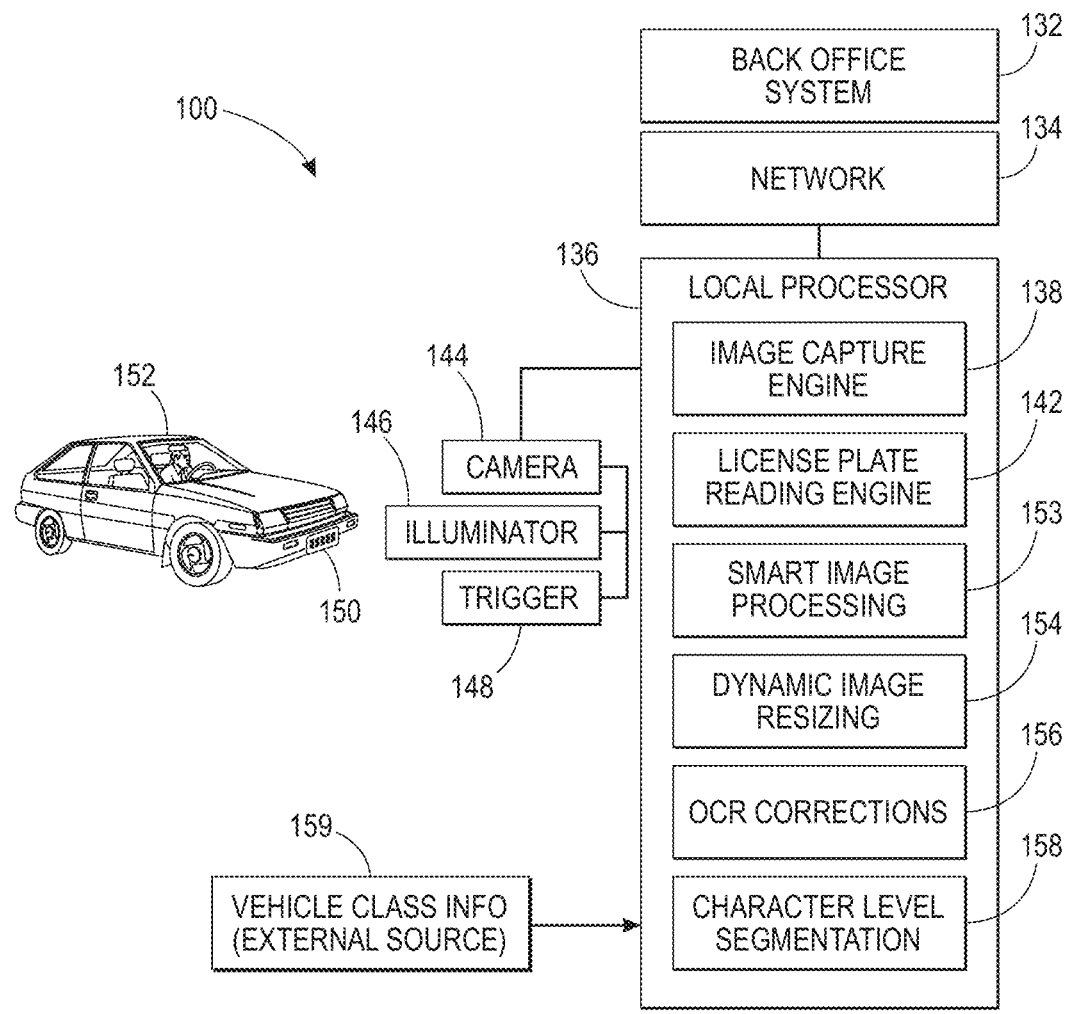
FIG. 9 illustrates a block diagram of an ALPR system for the dynamic adjustment of ALPR processing based on vehicle class information and other parameters in accordance with a preferred embodiment.

FIG. 9 illustrates a block diagram of an ALPR system 100 for the dynamic adjustment of ALPR processing based on vehicle class information and other parameters in accordance with a preferred embodiment. System 100 shown in FIG. 9 generally includes a back office system 132 that can communicate with a network 134, which in turn can communicates with a local processor 136 that includes and/or processes one or more modules/engines including, for example, an image capture engine 138, a license plate reading engine, a smart image processor, a dynamic image resizing module 154, an OCR corrections module 156 and a character level segmentation module 158. Note that particular vehicle class information can be provided from an external source 159 with respect to system 100.

The adjustments discussed herein can be provided by, for example, module 153, which includes instructions for smarter image cropping (e.g., for processing speed), and module 154 for dynamic image resizing to improve the capture rate of motorcycle plates. Additionally, module 156 implements corrections to OCR results based on allowable character sequences for a given class of plates, and module 158 provides instructions for improved character level segmentation based on known license plate layouts for a given vehicle class.

The local processor 136 can further communicate with a camera 144, an illuminator 146, and a trigger 148. The camera together with the illuminator 146 and trigger 148 can capture one or more images of a vehicle 152. Note that the network 134 (e.g., a local wireless network, the Internet, cellular communications network, other data network, etc) can assist the back office system 132 for processing transactions and managing patron accounts. The local processor 136 can communicate with the back office system 132 via the network 134.

In FIG. 9, the license plate 150 is depicted located on the front of the vehicle 152, but the license plate 150 can be located on the rear of the vehicle 152, as well. In one scenario, the vehicle 152 enters a license plate reading zone which contains the trigger device 148 which controls the illuminator 46 which illuminates the license plate region of the vehicle 152, and the camera 144 which images the license plate 150 on the vehicle 152.

The image capture engine 138 can control the trigger 148, illuminator 146, and camera 144 in order to properly image the vehicle 152 and the license plate 150. The local processor 136 can then send the license plate 150 and state jurisdiction data over the network 134 to the back office system 132. The back office system 312 processes the license plate and state jurisdiction data and assesses a toll or otherwise interacts with a patron account or takes other transportation application specific actions.

As will be appreciated by one of skill in the art, the disclosed embodiments can be implemented as a method, data-processing system, or computer program product. Accordingly, the embodiments may take the form of an entirely hardware implementation, an entirely software embodiment or an embodiment combining software and hardware aspects all generally referred to as a "circuit" or "module" or "engine". For example an "engine" may be a software module.

Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.) The computer program code, however, for carrying out operations of the present invention may also be written in conventional procedural programming languages, such as the "C" programming language or in a visually oriented programming environment, such as, for example, visual basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein, such as, for example, the various instructions/blocks shown with respect to FIGS. 8-9.

These computer program instructions may also be stored in a computer-readable memory that can direct a computer or other programmable data-processing apparatus to function in a particular manner, such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 10:
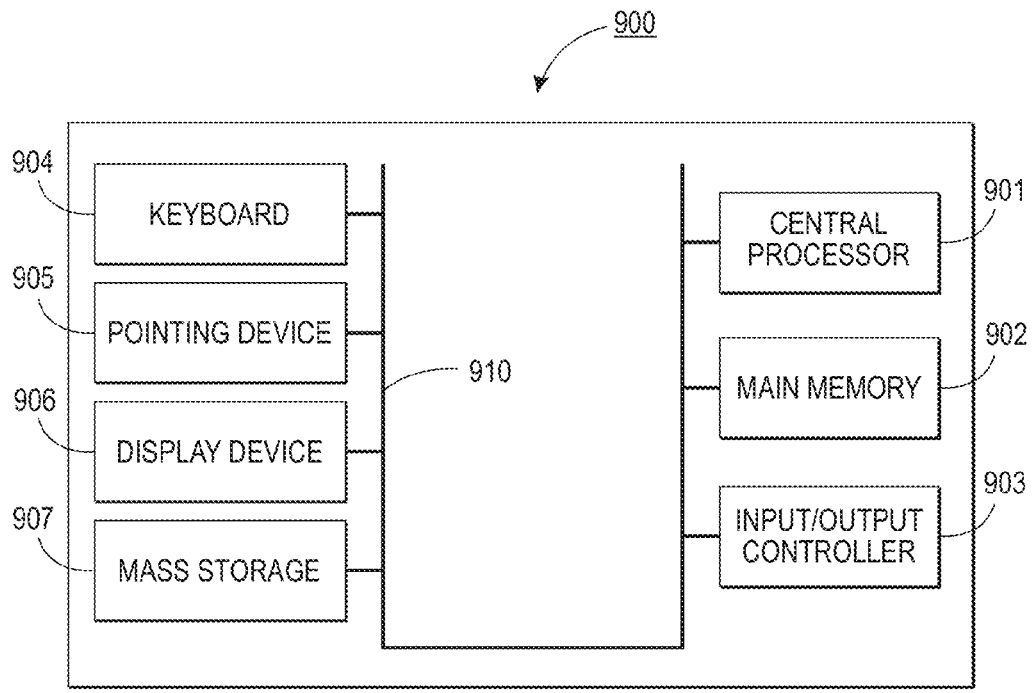
FIG. 10 illustrates a schematic view of a computer system, which can be implemented in accordance with one or more of the disclosed embodiments.
Figure 11:
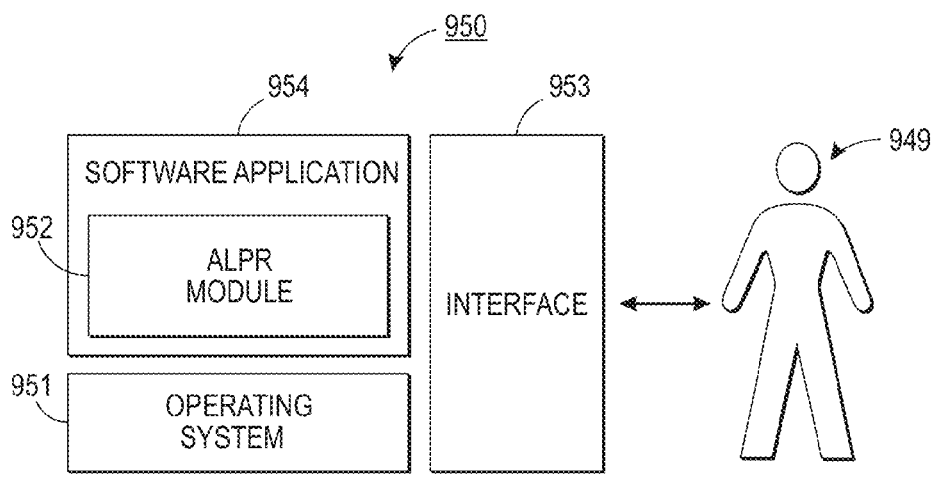
FIG. 11 illustrates a schematic view of a software system including an ALPR module, an operating system, and a user interface, in accordance with one or more aspects of the disclosed embodiments.

FIGS. 10-11 are provided as exemplary diagrams of data-processing environments in which embodiments of the present invention may be implemented. It should be appreciated that FIG. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device, such as a mouse, track ball, pen device, etc), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

It can be appreciated that in some embodiments, the processor 901 may process instructions from one or more of the modules/engines 138, 142, 152, 154, 156 and 148 shown in FIG. 9, and that in fact, the data-processing system 900 may function as the local processor 36, or, for example, the back office system 32 shown in FIG. 4 and further can communicate with, for example, the camera 44, the illuminator 46, the trigger 48, etc. depicted in FIG. 9.

FIG. 11 illustrates a computer software system 950, which may be employed for directing the operation of the data-processing system 900 depicted in FIG. 10. Software application 954, stored in main memory 902 and on mass storage 907 generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 11, module 952 can be implemented as, for example, a module that performs the logical instructions or operations of for example, method 80 and system 100 respectively illustrated in FIGS. 9 and 10, or other appropriate methods/processes. Module 952 can, for example, implement one or more of the modules shown in FIG. 9.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules (e.g., module 952) can include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 953 (e.g., a graphical user interface), can serve to display results, whereupon a user may supply additional inputs or terminate a particular session. In some embodiments, operating system 951 and interface 953 can be implemented in the context of a "windows" system. It can be appreciated, of course, that other types of systems are potential. For example, rather than a traditional "windows" system, other operation systems, such as, for example, a real time operating system (RTOS) more commonly employed in wireless systems may also be employed with respect to operating system 951 and interface 953. The software application 954 can include, for example, user proximity detection module 952, which can include instructions for carrying out steps or logical operations such as those shown in FIGS. 8 and 9.

FIGS. 10-11 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for improving automated license plate recognition performance, said method comprising:

capturing at least one image of at least one vehicle via an automated license plate recognition engine;

obtaining vehicle class information associated with said at least one vehicle;

analyzing said vehicle class information with respect to said at least one vehicle to thereby guide the automated license plate recognition engine; and dynamically adjusting a key aspect of the automated license plate recognition engine based on the vehicle class information to thereby enhance recognition of said at least one vehicle via said automated license plate recognition engine.

2. The method of claim 1 wherein dynamically adjusting said data with respect to said at least one vehicle based on a per image basis, further comprises: cropping at least one image associated with said at least one vehicle based on increasing granularity of said cropping to increase a processing speed of said automated license plate recognition engine.

3. The method of claim 1 wherein dynamically adjusting said data with respect to said at least one vehicle based on a per image basis, further comprises: dynamically resizing said at least one image to improve a rate of capture of said at least one image and license plate data identified in said at least image.

4. The method of claim 1 wherein dynamically adjusting said data with respect to said at least one vehicle based on a per image basis, further comprises: correcting OCR results with respect to said at least one image based on allowable character sequences for said vehicle class information with respect to said at least one vehicle.

5. The method of claim 1 wherein dynamically adjusting said data with respect to said at least one vehicle based on a per image basis, further comprises: improving character level segmentation based on known license plate layouts based on said vehicle class information with respect to said at least one vehicle.

6. The method of claim 1 wherein obtaining vehicle class information associated with said at least one vehicle, further comprises: obtaining said vehicle class information associated with said at least one vehicle from a source external to said automated license plate recognition engine; and providing said vehicle class information to said automated license plate recognition engine.

7. The method of claim 6 wherein dynamically adjusting said data with respect to said at least one vehicle based on a per image basis, further comprises: cropping at least one image associated with said at least one vehicle based on increasing granularity of said cropping to increase a processing speed of said automated license plate recognition engine; dynamically resizing said at least one image to improve a rate of capture of said at least one image and license plate data identified in said at least image; correcting OCR results with respect to said at least one image based on allowable character sequences for said vehicle class information with respect to said at least one vehicle; and/or improving character level segmentation based on known license plate layouts based on said vehicle class information with respect to said at least one vehicle.

8. A system for improving automated license plate recognition performance, said system comprising:
   a processor;
   a data bus coupled to said processor; and
   a computer-usable medium embodying computer program code, said computer-usable medium being coupled to said data bus, said computer program code comprising instructions executable by said processor and configured for:
   capturing at least one image of at least one vehicle via an automated license plate recognition engine;
   obtaining vehicle class information associated with said at least one vehicle;
   analyzing said vehicle class information with respect to said at least one vehicle to thereby guide the automated license plate recognition engine; and
   dynamically adjusting a key aspect of the automated license plate recognition engine based on the vehicle class information to thereby enhance recognition of said at least one vehicle via said automated license plate recognition engine.

9. The system of claim 8 wherein said instructions are further configured for cropping at least one image associated with said at least one vehicle based on increasing granularity of said cropping to increase a processing speed of said automated license plate recognition engine.

10. The system of claim 8 wherein said instructions are further configured for dynamically resizing said at least one image to improve a rate of capture of said at least one image and license plate data identified in said at least image.

11. The system of claim 8 wherein said instructions are further configured for correcting OCR results with respect to said at least one image based on allowable character sequences for said vehicle class information with respect to said at least one vehicle.

12. The system of claim 8 wherein said instructions are further configured for improving character level segmentation based on known license plate layouts based on said vehicle class information with respect to said at least one vehicle.

13. The system of claim 8 wherein said instructions are further configured for: obtaining said vehicle class information associated with said at least one vehicle from a source external to said automated license plate recognition engine; and providing said vehicle class information to said automated license plate recognition engine.

14. The system of claim 13 wherein said instructions are further configured for: cropping at least one image associated with said at least one vehicle based on increasing granularity of said cropping to increase a processing speed of said automated license plate recognition engine; dynamically resizing said at least one image to improve a rate of capture of said at least one image and license plate data identified in said at least image; correcting OCR results with respect to said at least one image based on allowable character sequences for said vehicle class information with respect to said at least one vehicle; and/or improving character level segmentation based on known license plate layouts based on said vehicle class information with respect to said at least one vehicle.

15. A non-transitory processor-readable medium storing computer code representing instructions to cause a process for improving automated license plate recognition performance, said computer code further comprising code to:
   capture at least one image of at least one vehicle via an automated license plate recognition engine;
   obtain vehicle class information associated with said at least one vehicle;
   analyze said vehicle class information with respect to said at least one vehicle to thereby guide the automated license plate recognition engine; and
   dynamically adjust a key aspect of the automated license plate recognition engine based on the vehicle class information to thereby enhance recognition of said at least one vehicle via said automated license plate recognition engine.

16. The processor-readable medium of claim 15 wherein said code further comprises code to crop at least one image associated with said at least one vehicle based on increasing granularity of said cropping to increase a processing speed of said automated license plate recognition engine.

17. The processor-readable medium of claim 15 wherein said code further comprises code to dynamically resize said at least one image to improve a rate of capture of said at least one image and license plate data identified in said at least image.

18. The processor-readable medium of claim 15 wherein said code further comprises code to correct OCR results with respect to said at least one image based on allowable character sequences for said vehicle class information with respect to said at least one vehicle.

19. The processor-readable medium of claim 15 wherein said code further comprises code to improve character level segmentation based on known license plate layouts based on said vehicle class information with respect to said at least one vehicle.

20. The processor-readable medium of claim 15 wherein said code further comprises code to: obtain said vehicle class information associated with said at least one vehicle from a source external to said automated license plate recognition engine; and provide said vehicle class information to said automated license plate recognition engine.

\* \* \* \* \*

UNITED STATES PATENT AND TRADEMARK OFFICE
CERTIFICATE OF CORRECTION

PATENT NO. : 9,082,038 B2  
APPLICATION NO. : 13/904559  
DATED : July 14, 2015  
INVENTOR(S) : Vladimir Kozitsky et al.

Page 1 of 1

It is certified that error appears in the above-identified patent and that said Letters Patent is hereby corrected as shown below:

On the Title Page, Item (54) and in the Specification, Column 1:
Title: Please delete "DRAM C" and insert therefore -- DYNAMIC --.

Signed and Sealed this
Tenth Day of November, 2015

Michelle K. Lee
*Director of the United States Patent and Trademark Office*